Aug. 15, 1939   C. F. SCHLEGEL   2,169,503
WINDOW MOUNTING
Filed April 15, 1938   2 Sheets-Sheet 1
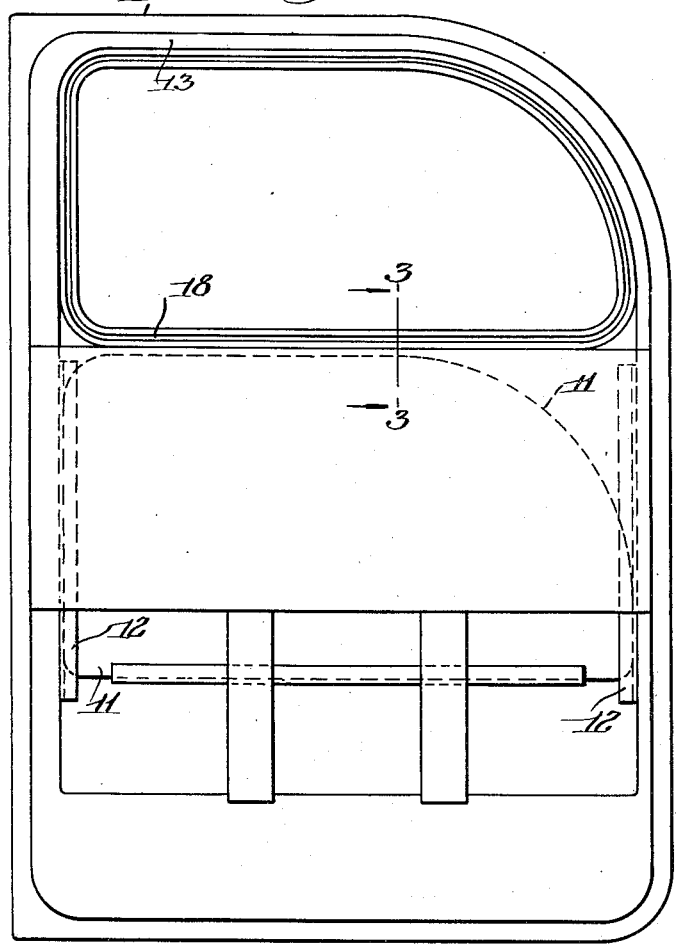
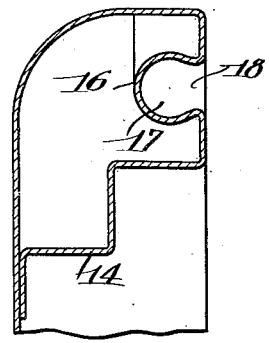
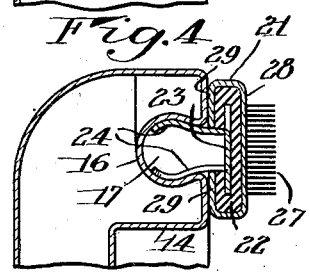
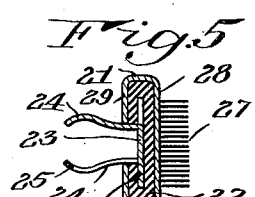
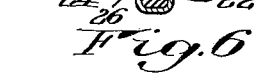
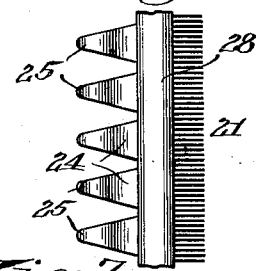
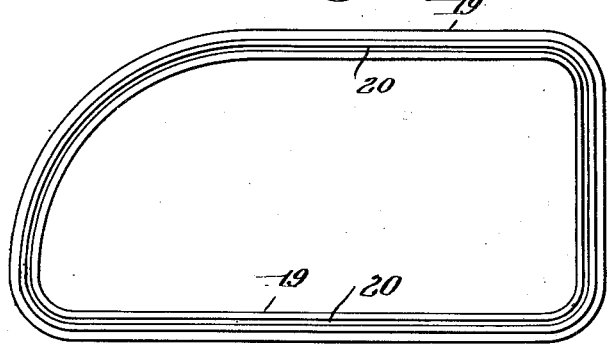
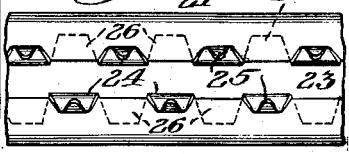
INVENTOR.
Carl F. Schlegel
BY Cumpston & Shepard
his ATTORNEYS Aug. 15, 1939. C. F. SCHLEGEL 2,169,503
WINDOW MOUNTING
Filed April 15, 1938 2 Sheets-Sheet 2
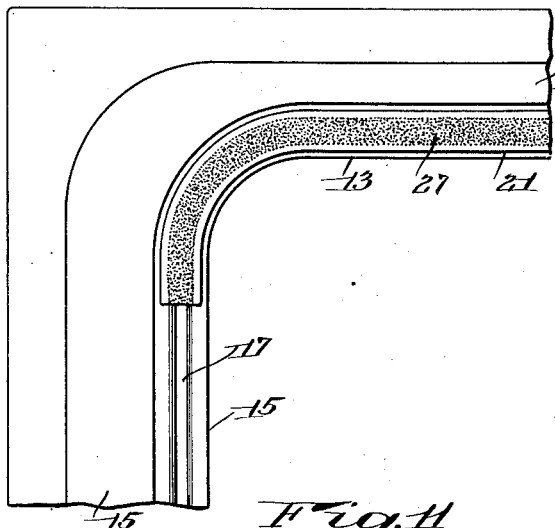
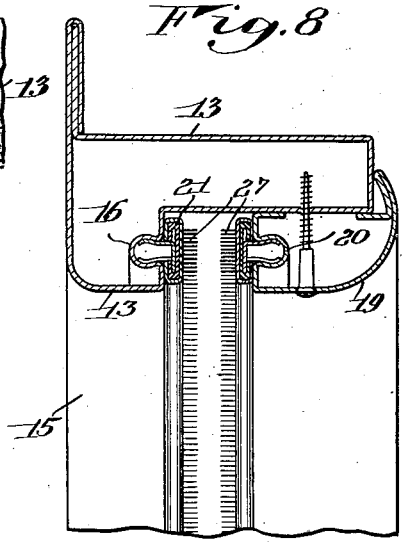
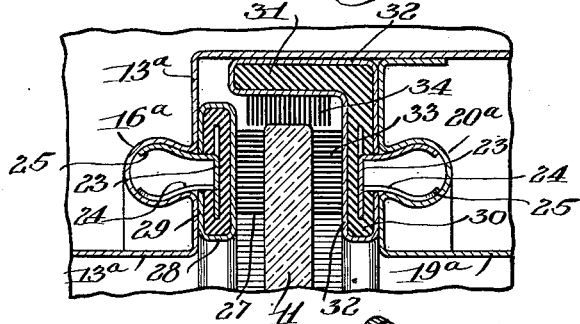
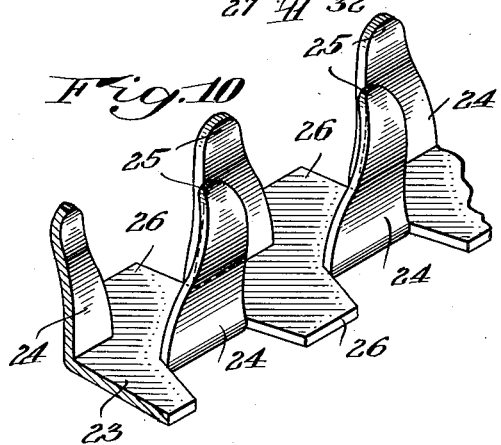
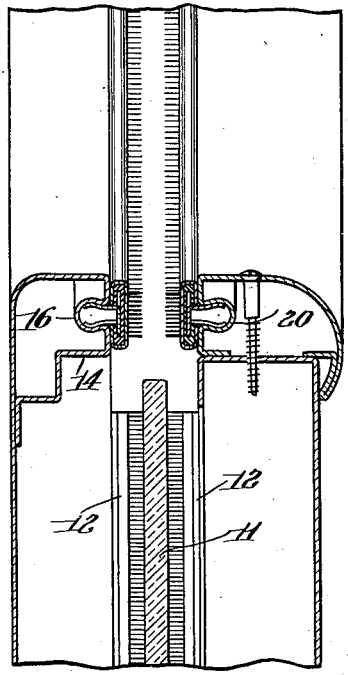
INVENTOR.
Carl F. Schlegel
BY Cumpston & Shepard
his ATTORNEYS

Patented Aug. 15, 1939

2,169,503

UNITED STATES PATENT OFFICE 2,169,503

WINDOW MOUNTING

Carl F. Schlegel, Brighton, N. Y., assignor to The Schlegel Manufacturing Company, Rochester, N. Y., a corporation of New York Application April 15, 1938, Serial No. 202,279

2 Claims. (Cl. 20—69)

The present invention relates to a window mounting designed for protecting and guiding windows and other closures, and particularly the window panes of various types of motor vehicles, including automobiles, airplanes, water craft, and other conveyances.

One object of the invention is to provide improved guiding means for windows, doors, and other closures, designed to effectively cushion and protect the same and to afford a simplified construction which is easy to install, effective in use, and comparatively inexpensive to manufacture.

A further object of the invention is to provide an improved unitary and efficient mounting strip for maintaining a weather-tight connection between doors, windows and other closures, and the framework thereof, and which is particularly designed with a view to facilitating ready and convenient application of the strip to and removal from the framework or other supporting means therefor, without the use of tools or separable retaining parts for the same.

A further object of the invention is to provide an improved unitary strip of the class described which is capable of being readily bent to different shapes in order that it may easily be made to conform to the contour or curvature of a door, window, or other closure, or to the framework thereof, and which includes self-contained means for connecting it with said framework.

A further object of the invention is to provide an improved frame structure having a groove or recess, in combination with a flexible or resilient closure-protecting or guiding strip having securing means designed to be readily snapped or pressed within said groove or recess and to be withdrawn therefrom when desired.

To these and other ends the invention resides in certain improvements and combinations of parts, all as will be hereinafter more fully described, the novel features being pointed out in the claims at the end of the specification.

In the drawings:

Fig. 1 is a view in elevation of an automobile door with the garnish molding of the window frame and the weather strip of the outer molding removed;

Fig. 2 is an elevational view of the garnish molding shown removed from the door frame;

Fig. 3 is a fragmentary sectional view taken substantially on line 3—3 of Fig. 1, with the weather strip omitted;

Fig. 4 is a similar view showing the weather strip attached to the frame of the door;

Fig. 5 is a transverse section through the weather-strip shown in Fig. 6;

Fig. 6 is a fragmentary view of the weatherstrip looking in the direcetion of one edge thereof;

Fig. 7 is a fragmentary view of the strip looking at the side thereof having the means for securing the strip upon the door frame;

Fig. 8 is a vertical section through the door shown in Fig. 1, drawn to an enlarged scale and showing the weather strips applied thereto;

Fig. 9 is a fragmentary elevational view of one corner of the door, as viewed from the right of Fig. 8, with the garnish molding removed and showing the outer weather strip bent to conform to the curvature of one corner of the window frame;

Fig. 10 is a fragmentary view in perspective of the means for attaching the weather strip to the door frame, drawn to an enlarged scale, and Fig. 11 is a fragmentary sectional elevation through the top of a door frame similar to that of Fig. 8 and showing a modified arrangement of weather stripping.

The same reference numerals throughout the several views indicate the same parts.

The mounting strip of the present invention is shown in connection with the window of an automobile door, but may be used as a protecting, guiding or cushioning strip for various types of doors or closures, or employed for other useful purposes such, for example, as a bumper for protecting furniture and the like.

The door of Fig. 1 is designated generally by the reference numeral 10 and is provided with the usual window opening and window pane 11, guided for movement within the lower portion of the door by the oppositely disposed channels 12, it being understood that any suitable means, not shown, may be provided for elevating and lowering the window.

The one-piece window frame comprises the upper and lower portions 13 and 14 shown in section in Fig. 8, and the side portions 15, which are of similar construction. The frame is provided with an inwardly offset continuous channel-like member 16 having a recess or groove 17 provided with an entrance 18 of less width than said recess, as indicated in Fig. 3. The garnish molding comprises a continuous section 19 detachably connected with the window frame by any suitable means such, for example, as screws or bolts. The garnish molding is also provided with an inwardly turned channel-like portion 20 having a groove or recess similar to the recess 17 of the channel-like member 16 and provided with a restricted entrance corresponding to the entrance 18 of the groove 17 of Fig. 3.

One form of my improved mounting strip is shown separated from the door frame in Figs. 5, 6, and 7, and is designated generally by the reference numeral 21. It comprises a substantially flat strip of rubber 22 or other suitable material, within which is embedded a portion of a retaining element 23 for the strip in the form of a metal plate having struck up from the opposite sides thereof the alternately disposed resilient tapered fingers 24, the extremities of which are inclined or curved inwardly at 25, Fig. 10, whereby to facilitate entrance of said fingers within the grooves or recesses of the channel-shaped members 16 and 20 of the outer and inner door frame moldings, respectively. The retaining member 23 is connected with the strip of rubber 22 preferably by molding the material of the latter around the oppositely extending and alternately arranged tapered portions 26 of the metal plate, which lie between the fingers 24, and which form in effect a core extending longitudinally within the strip of rubber 22.

The cushioning or window engaging portion of the strip may be formed of any suitable flexible or resilient material but preferably comprises a resilient pile surface 27 of relatively long pile fibers interwoven with a strip 28 of heavy fabric, the longitudinal edge portions 29 of which are folded around the opposing edges of the strip of rubber 22, as shown in Figs. 4 and 6. The fabric of the cushioning strip may be secured upon the rubber strip either by cementing or stitching it thereto or otherwise as preferred.

It will be understood that the weather stripping 21 may be formed of relatively long lengths and that the strips to be applied to the door or window frame will each be cut to a length corresponding to the overall length of the groove or recess within which the retaining fingers of the strip are to be placed, the ends of the strip being closely fitted together and in a manner to render the joint between the same inconspicuous.

The weather strip 21 is sufficiently flexible to permit it to be readily bent to conform to the contour of the window glass and to the moldings of the window frame when applying it thereto. Due to the resiliency or flexibility of the spring fingers 24 of the weather strip they can readily be pressed or snapped into the grooves or recesses of the channel-shaped portions 16 and 20 of the outer and inner door frame moldings, respectively, within which the fingers will remain in interlocking engagement with the inner walls of said channel-shaped members, as shown in Figs. 4 and 8. The preferred method of applying the weather stripping to the door frame is to start with one end of the strip and insert the resilient fingers thereof within the groove by pressing on the strip in the direction of the groove and progressively continuing the operation of pressing the strip into position until the ends of the strip are brought into abutting relation. During this operation the spring fingers will be successively snapped into interlocking engagement with the walls of the channel-shaped members 16 and 20, as the act of wrapping the strip around the inner contours of said members continues. It will be obvious that these operations can be rapidly performed without the use of tools or any of the separable parts generally employed to connect weather stripping with the framework of doors and windows.

In assembling the strips the one shown positioned within the recess of the outer channel-shaped member 16 can readily be placed therein before applying the garnish molding to the door frame. Moreover the weather strip of the garnish molding can easily be applied to the channel-shaped portion 20 thereof in the manner previously described, before attaching the molding to the door frame.

In case the strips become worn and need to be replaced with new ones, the garnish molding can readily be removed, after which each strip can be quickly detached from the molding by lifting one of its ends from the groove and pulling on the strip in a direction away from the groove until it is completely withdrawn therefrom.

It will be apparent from the present disclosure that the strips 21 serve both as a means for maintaining a weather-tight connection between the window glass and the framework of the door and also serve as a means for cushioning the glass and for preventing rattling of the same.

In the modification shown in Fig. 11, one of the weather strips is the same as that shown in Figs. 5, 6, and 7, and has, therefore, been given the same reference characters, said strip having the fingers 24 thereof disposed within the groove of an inwardly turned channel-shaped member 16a of the top rail 13a of a frame which corresponds substantially to the top rail 13 of the frame shown in Fig. 8. The modified form of weather strip is constructed for engagement not only with one side of the window glass 11, but with the edge portion thereof as well, whereby to provide resilient means for resisting movement of the glass in its own plane, as well as to more effectively seal the joint between the window frame and the top and side portions of the glass. The modified strip is similar to the strip shown in Figs. 5, 6, and 7, except that it is of angular construction and embodies two cushioning pads instead of one, disposed one at a right angle to another as shown in Fig. 11. The angularly disposed portions of the rubber strip are designated by the reference numerals 30 and 31 and have applied thereto a heavy strip of fabric 32, the longitudinal edge portions of which are disposed on the outer face of the portion 30 of the strip and terminate adjacent the fingers 24 of the retaining element 23 which is the same as that shown in Fig. 10 and which is secured to the portion 30 of the strip by having the material thereof molded about the parts 26 of said retaining element. The fabric 32 is provided with resilient pads 33 and 34 opposite the portions 30 and 31 of the rubber strip, respectively, each pad preferably comprising a pile surface formed of relatively long pile fibers interwoven with the fabric strip. As shown in Fig. 11 the resilient pad 33 engages the window glass at one side thereof while the pad 34 is in engagement with the side edge portion of the glass. The pad 34 is extended along the top of the window frame and downwardly at both sides thereof to points adjacent the upper ends of the lower window guides 12 while the pads 27 and 33 are preferably made continuous and extend entirely around the window frame.

The modified strip has the resilient fingers 24 of the retaining element 23 disposed within the recess or groove of an inwardly turned channel portion 20a of a garnish molding 19a, similar to the channel 20 of the garnish molding 19, Fig. 8. The modified strip is sufficiently flexible to permit it to be bent and applied to the garnish molding 19a in the manner previously described in connection with the application of the strip shown in Fig. 8 to the molding 19.

While the weather strip has been shown in connection with the window frame of a door of a motor vehicle to contact a window pane, it will be understood that it may be applied to the frames of other doors or closures for contacting said doors and closures, or used as a guard or protecting strip for furniture, or employed for other useful purposes as desired. It will also be understood that in certain usages of the strip a grooved metal holder may be provided for mounting the same, and designed for ready application to the support with which it may be desired to connect the strip.

In attaching the strip to the window frame or molding it will be apparent that it can readily be applied merely by wrapping it around the inner portion thereof and at the same time snapping or pressing the resilient fingers of the strip within the groove, upon the completion of which operation the strip will conform to the curvature of the molding and will be firmly secured thereto by reason of the interlocking engagement of the fingers with the walls of the groove. It will be obvious that the application of the strip in this manner can be effected without the use of cement, rivets, bolts, or other separate parts such as are generally employed for securing weather stripping of this kind to the frames of doors and windows. It will be apparent therefore that not only is a considerable saving effected in the present construction by the omission of such parts, but that the time required to apply the weather stripping is greatly reduced, thereby economizing in the cost of labor, both in the application to and removal of the weather stripping from the door and window frames, or other supporting means to which it may be applied.

It is to be understood that although it is preferred to provide the body strip 22 with a cushioning strip of textile material, as shown and described, cushioning strips formed of other suitable materials may be secured on the body strip if desired, such, for example, as a strip of relatively soft rubber which, if preferred, may be made integral with the body strip.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A unitary weather strip comprising an elongated body member formed of rubber and having a resilient pad at one side thereof, and a metal strip having a securing portion provided with laterally projecting parts embedded within the material of the body member and also having oppositely disposed rows of upstanding finger-like members, those of each row being spaced one from another and in staggered relation relative to those of the opposite row, said finger-like members being formed for insertion within a groove of a supporting member for the weather strip and for cooperation with the walls of said groove to secure the strip on the supporting member.

2. A unitary weather strip comprising an elongated body member of rubber having a cushion pad on one side thereof, a metal strip having a longitudinal center line embedded in said body member, said strip comprising an anchoring section including a plurality of tabs, a plurality of resilient fingers integral with the anchoring section and extending substantially normal thereto, said fingers being in staggered relation on opposite sides of the longitudinal center, and said tabs lying outside of the fingers on each side of the longitudinal center line.

CARL F. SCHLEGEL.